June 19, 1923. 1,459,544
T. B. McLEROTH
AIR TUBE FOR PNEUMATIC TIRES
Filed June 16, 1920 3 Sheets-Sheet 1
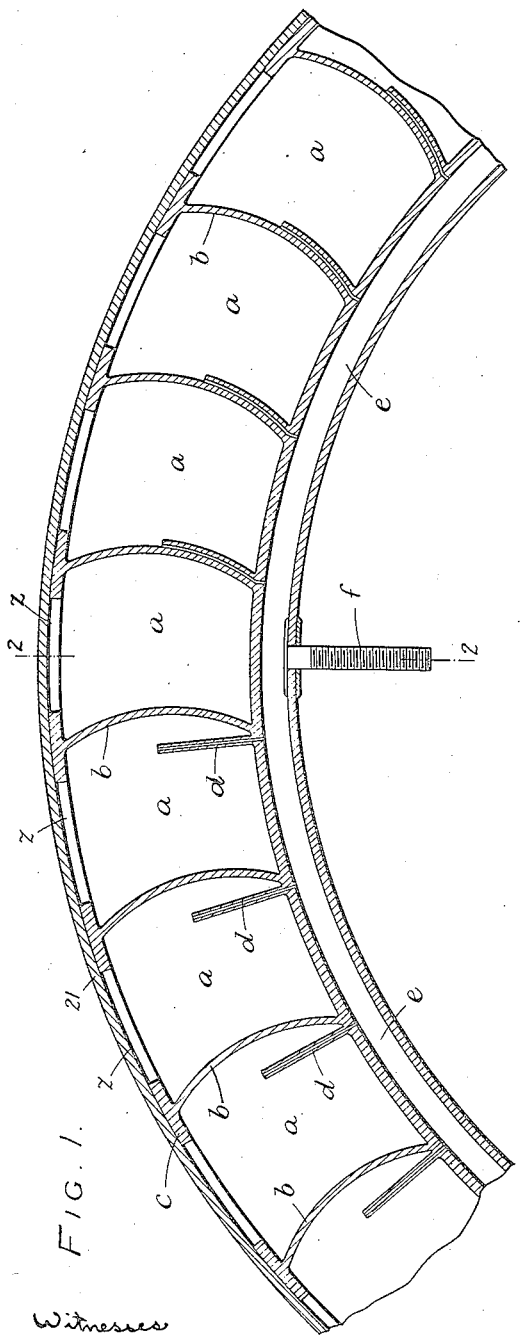
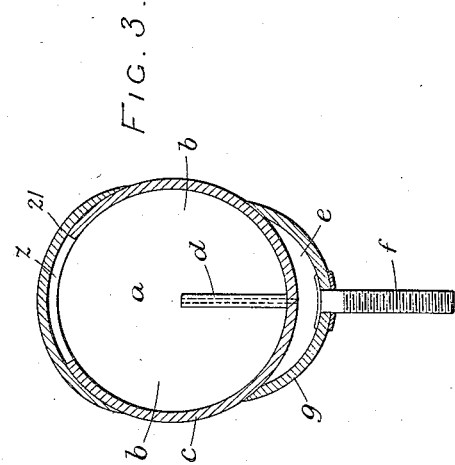
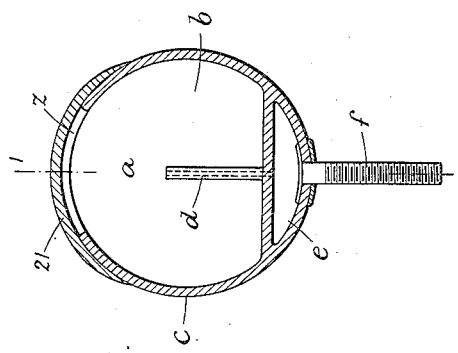

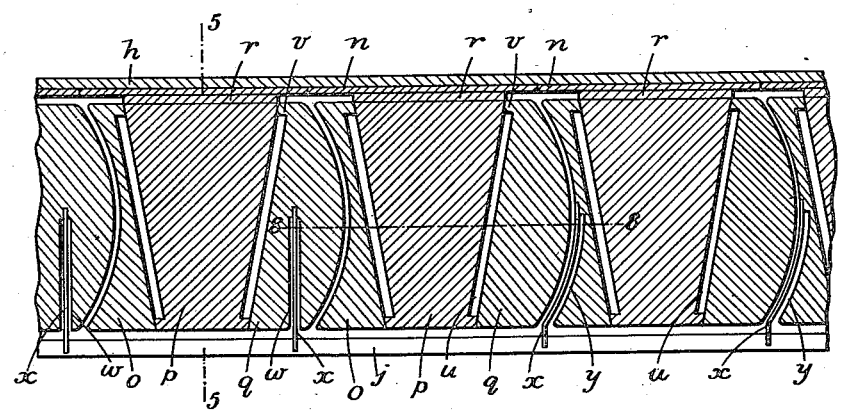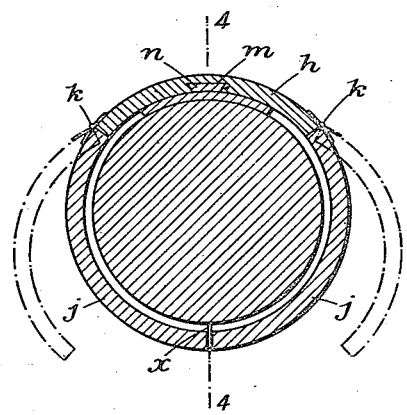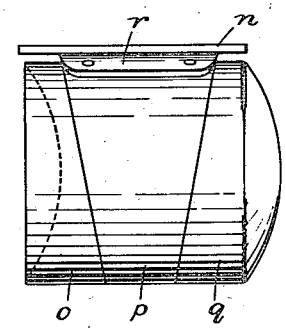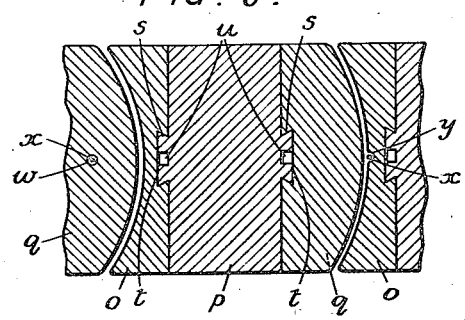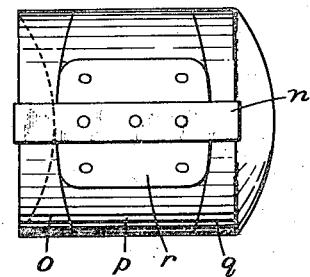

June 19, 1923.

T. B. McLEROTH 1,459,544

AIR TUBE FOR PNEUMATIC TIRES

Filed June 16, 1920    3 Sheets-Sheet 3

Patented June 19, 1923.

1,459,544

UNITED STATES PATENT OFFICE.

THOMAS BAKER McLEROTH, OF LONDON, ENGLAND, ASSIGNOR TO T. B. McLEROTH (TUBES) LIMITED, OF LONDON, ENGLAND, A BRITISH COMPANY.

AIR TUBE FOR PNEUMATIC TIRES.

Application filed June 16, 1920. Serial No. 389,293.

*To all whom it may concern:*

Be it known that I, THOMAS BAKER Mc-LEROTH, of "Barholm," 346 Camden Road, London, N. 7, England, a subject of the King of Great Britain and Ireland, have invented certain new and useful Improvements in Air Tubes for Pneumatic Tires, of which the following is a specification.

This invention relates to an air tube for pneumatic tires of the kind comprising a plurality of sections or compartments so arranged that the puncturing of one section or compartment will not materially affect the efficiency of the tire as a whole.

According to this invention an air tube for pneumatic tires is composed of a series of sections or compartments formed by partitions, into each of which sections or compartments leads an apertured projection, normally connected with a passage running around the inner periphery of the tube said passage being provided with a valve for inflation purposes.

The tube is preferably made in a length and the wall of each section or compartment is split or otherwise apertured to enable the core for said compartment to be withdrawn therefrom, and said aperture may be closed by a band or series of patches applied to said tube after the ends of a length of the tube have been joined to constitute an annulus.

The mould may be constituted by a tube formed in three parts, one corresponding with what will be the tread or outer periphery, and the two others with what will be the sides and inner periphery of the tube and the two last mentioned parts are hinged to the first mentioned part and are adapted to be clamped together at their free edges.

Preferably, also, the cores for the sections or compartments are adapted to be slidden successively into position in the mould, and each core is made in sections and adapted to be contracted, each core or the mould being so formed as to produce an aperture in the tread portion of the section or compartment, through which aperture the contracted core may be withdrawn.

Figure 9:
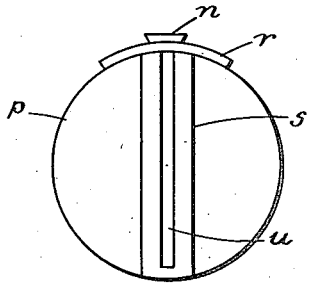
Figure 10:
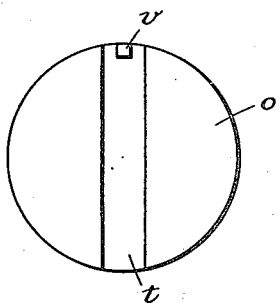
Figure 11:
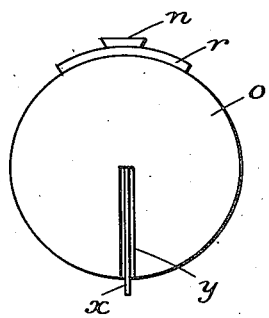
Figure 12:
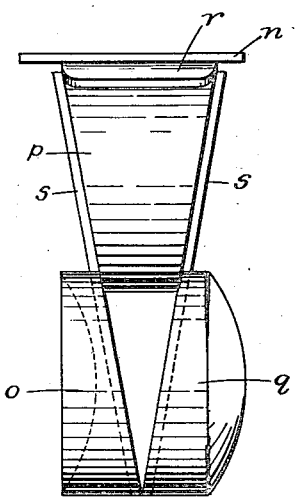
Figure 13:
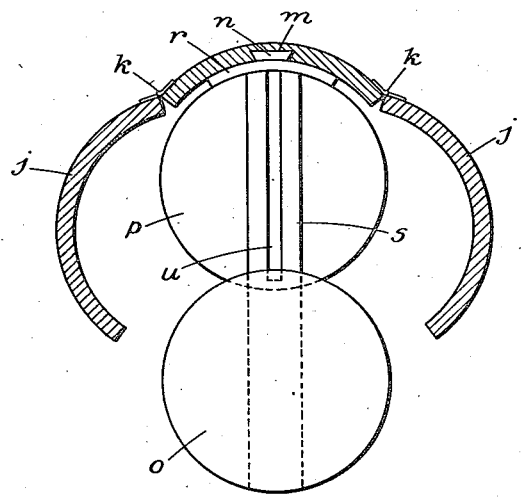

The invention is illustrated by the accompanying drawings wherein Figure 1 is a fragmentary section of one form of air tube, on the line 1—1, Figure 2, Figure 2 is a cross-section on the line 2—2, Figure 1, Figure 3 is a similar cross-section of another form of air tube, Figure 4 is a section of a mould on the line 4—4, Figure 5, Figure 5 is a cross section of the mould on the line 5—5, Figure 4, Figure 6 is a side elevation and Figure 7 is a plan of a core, Figure 8 is a sectional plan on the line 8—8 Figure 4, Figure 9 is an end view of a central section of a core, Figure 10 is an end view of the contiguous face of an outer section of a core, Figure 11 is an end view of the outer face of another form of outer section of a core, Figure 12 is a side elevation of a core in its contracted position and Figure 13 is an end view of a contracted core shewing the open mould in section.

As shewn in Figures 1 and 2 the air tube consists of a plurality of compartments $a$ ... formed by partitions $b$ in a tube $c$, into each of which compartments $a$ leads a thin rubber tube $d$ normally connected with a passage $e$ running around the inner periphery of the tube $c$ and provided with a valve $f$ for inflation purposes. Each of the compartments $a$ ... is of substantially D-shape in cross-section and occupies the greater part of the cross section of the tube $c$, and the passage $e$ is of similar shape and occupies but a small part of the cross section of said tube.

In the form illustrated by Figure 3 the passage $e$ instead of being formed in the tube $c$ itself is formed by a separate portion $g$ adapted to be secured to said tube by india rubber solution or the like.

The mould illustrated is adapted for the production of a tube $c$ of a section such as is illustrated by Figure 3 and is constituted by a tube formed in three parts $h$, and $j$, $j$, the part $h$ corresponding with what will be the tread or outer periphery of the tube $c$ to be produced, and the parts $j$, $j$ corresponding with what will be the sides and inner periphery of said tube, and the parts $j$, $j$ are hinged as at $k$, $k$ to the part $h$ and are adapted to be clamped together at their free edges by any convenient means (not shewn).

At its inner surface the part $h$ of the mould is formed with an undercut peripheral groove as at $m$, Figures 5 and 13, adapted to receive lugs $n$ on the cores for the several compartments $a$ ..., which cores may be slidden successively into position after the necessary india rubber has been suitably disposed in the mould according to the method of manufacture. As shewn in Figures 4, 6 and 7 the length of the lugs $n$ is slightly greater than that of the cores, so that when said cores are in position in the mould they are spaced slightly from one another. Each core is made in three parts $o$, $p$, $q$ whereof the central part $p$ is secured to the lug $n$ as shewn in Figure 7 and is formed with or has secured thereto a projection $r$ of substantially the same length, longitudinally of the mould, as the central part $p$, said projection $r$ being adapted to contact with the part $h$ of the mould so as to produce an aperture in the tread of the tube $c$. The contiguous faces of the central and outer parts $p$ and $o$, $q$ of the core are inclined to the axis of the core, converging towards the inner periphery of the mould as shewn in Figures 4, 6 and 12 and said parts are slidably interconnected by forming the end faces of the part $p$ with dovetailed tongues $s$, $s$ and the contiguous faces of the parts $o$ and $q$ with corresponding grooves $t$, $t$. The tongues $s$, $s$ are slotted as at $u$, almost to the inner ends thereof and the parts $o$ and $q$ are provided, in the grooves $t$, $t$, with stops, as at $v$, adapted to be received in the slots $u$ and to engage the closed inner ends thereof. The construction is such that as the mould is drawn away from the inner periphery of the tube $c$ the central part $p$ of the core is first withdrawn as shewn in Figures 12 and 13, drawing the outer parts $o$, $q$ towards one another and thus contracting the core, and the outer parts $o$, $q$ are then withdrawn as one with the central part $p$.

The outer end faces of the parts $o$ . . . are made concave and the outer end faces of the parts $q$ . . . are made convex for a purpose to be referred to hereinafter.

As shewn at the left hand side of Figure 4, the part $q$ of each core is formed with a bore $w$ radially of the mould and debouching at the inner periphery of the tube $c$ to be formed, and in said bore $w$ is coaxially disposed a fine wire $x$ projecting therefrom and adapted to extend between the free edges of the parts $j$, $j$ of the mould when said mould is closed as shewn in Figures 4 and 5, the bore $w$ and wire $x$ being adapted to form the fine rubber tube $d$ leading into the compartment $a$. The right hand side of Figure 4, and Figure 11 illustrate different means whereby the fine tubes $d$ . . . may be produced integrally with the partitions $b$. For this purpose instead of forming each part $q$ with a bore $w$ the outer face of each part $o$ is formed with a groove $y$ of semi-circular cross-section extending to the inner edge of said part, and coaxially within said groove is disposed a fine wire $x$ adapted to extend as above set forth and curved to conform with the configuration of the outer face of the part $o$. Cores of the construction shewn in Figs. 5 to 10 may be used in the same mould in conjunction with cores of the type shewn in Fig. 11, such joint use of both kinds of cores being illustrated by Fig. 4. With a mould such as shewn in Fig. 4, the air tube produced will be substantially of the character represented in Fig. 1.

According to one method of manufacture the parts $j$, $j$ of the mould are swung open as indicated in dotted lines in Figure 5, india rubber is placed in position in the mould and around a core $o$, $p$, $q$, the lug $n$ of another core $o$, $p$, $q$ is slidden into the groove $m$ and said other core is surrounded with india rubber and so on, The mould is then closed and the tube is vulcanized in the usual manner, the narrow slit left between the free edges of the parts $j$, $j$ of the mould, due to the projection of the wires $x$ . . . therebetween providing an outlet for the spewing over of the rubber in the usual manner.

After vulcanization is complete the parts $j$, $j$ are swung open and the mould is drawn away from the tube $c$, all the cores being simultaneously contracted and then withdrawn from the several compartments $a$ through the apertures $z$ in the tread of the tube $c$, the wires $x$ . . . being simultaneously withdrawn from the fine tubes $d$ . . . A length of tube so produced is then joined up at its ends in the usual manner to constitute an annulus and a tread band 21 or a series of patches is or are applied to close the apertures $z$ . . . through which the cores were withdrawn. Another band $g$ is then applied at the inner periphery of the tube $c$, being attached at its edges only so as to form a common air passage $e$ with which communicate all the fine tubes $d$ . . .

In order to produce a tube $c$ of the cross-section shewn in Figure 2, the parts $o$, $p$ and $q$ of the cores are made D-shaped, the flat side being situated remote from the part $h$ of the mould. Means, such as described above, are provided for producing the fine tubes $d$ . . . but the wires $x$ . . . do not project so far as the junction of the parts $j$, $j$ of the mould, but are adapted to engage apertures in a core, in the form of a rod of D-section, for the air passage $e$ which is common to all the compartments $a$ . . . If desired said D-section rod may be formed of a plurality of short lengths strung on a wire or the like, so that one of said lengths may be slidden into position as and when each core is so placed and so that the totality of such lengths may be withdrawn as one axially from the passage $e$ by pulling on the wire or the like, after the mould has been opened and the cores withdrawn thus disengaging the fine wires $x$ . . . from the apertures in said D-section rod.

If desired the projections $r$ . . . which produce the apertures $z$ . . . in the tread of the tube $c$ may be provided on the inner face of the part $h$ of the mould, but it is preferable that they should be on the central parts *p* of the cores so as to ensure correct positioning.

It is desirable that the outer faces of the parts *o* and *q* of the cores should be made concave and convex as above set forth so that when the tube *c* is fully inflated in use the diaphragms *b* . . . may be slack, that is to say, may not be in tension.

When a tube made in accordance with this invention is being inflated air passes through the passage *e* and fine tubes *d* . . . to all the compartments *a* . . . the pressure being equally distributed throughout. In the event of the puncture of any compartment *a* the reduction of pressure therein consequent upon the escape of air therefrom permits the diaphragms *b*—*b* on either side thereof to belly out towards one another due to the pressure acting thereon and this bellying out causes the fine tube *d* in the punctured compartment to be bent over thus breaking off the connection with said compartment of the passage *e* and preventing further escape of air. The diaphragms *b* . . . separating the remaining compartments *a* . . . all belly out slightly towards the punctured compartment so that the pressure within the tire is once more equally distributed and the puncturing of the compartment will not materially affect the efficiency of the tire as a whole.

It will be observed that each of the compartments *a*, as long as it is not punctured, has a free communication, through the corresponding tube *d*, with the circumferential passage *e*, so that air may pass through said tube freely in either direction as long as the particular compartment is not punctured. This is of importance not only by permitting the several compartments to be inflated simultaneously through a single inflating valve *f* connected with said passage or channel *e* but equally in case it is desired to deflate the air tube for the purpose of removing it, for instance in order to repair the tube after a puncture. In the event of a puncture, as explained above, the tube *d* of the punctured compartment will be bent by the bellying out of one or both diaphragms *b* of such compartment, sufficiently to close the channel of such tube and thus interrupt communication between the passage or channel *e* and the punctured compartment *a*. To repair the tube, its removal from the wheel will be necessary; to remove a tube all compartments of which (except the punctured one) are still inflated, would be practically impossible. Now, by simply opening the inflating valve *f* in the well known way, air will be allowed to escape at once not only from the circumferential passage *e* but from all unpunctured compartments *a*, since air may pass freely from the unpunctured compartments into said circumferential passage.

While the invention has been described and claimed as an air tube for pneumatic tires, it will be obvious that a tube embodying the features of this invention might serve as a so-called single tube tire, and I desire the claims to be interpreted as covering this use.

I claim:—

1. An air tube for pneumatic tires having a series of partitions dividing said tube into a series of compartments, a fine rubber tube in each of said compartments adjacent to one of said partitions, said air tube being formed with a passage running around the inner periphery thereof and said passage communicating with said compartments through said fine rubber tubes and being provided with an inflation valve.

2. An air tube for pneumatic tires having a series of partitions dividing said tube into a series of compartments and adapted to be bellied out into a punctured compartment, a flexible rubber tube in each compartment, in the path which a partition of such compartment will follow in the event of such compartment's being punctured, so that the bellied-out partition of the puncture compartment will come in contact with said flexible tube, and bend it to close the passage of such flexible tube, said air tube being further formed with a passage running around the inner periphery thereof and normally communicating with said compartments through said flexible rubber tubes and being provided with an inflation valve.

3. An air tube for pneumatic tires having a series of partitions dividing said tube into a series of compartments, a fine rubber tube in each of said compartments, a band secured at its edges to the inner periphery of said tube and forming a passage therearound, said passage communicating with said compartments through said fine rubber tubes and being provided with an inflation valve.

4. An air tube for pneumatic tires having a series of partitions dividing said tube into a series of compartments, said partitions being slack when said tube is fully inflated, a fine rubber tube in each of said compartments adjacent to one of said partitions, said air tube being formed with a passage running around the inner periphery thereof and said passage communicating with said compartments through said fine rubber tubes and being provided with an inflation valve.

5. An air tube for pneumatic tires having an inflating channel provided with an inflation valve, a series of partitions dividing said tube into a series of compartments and adapted to be bellied-out into a punctured compartment, said partitions being slack when the tube is fully inflated, a connection in each compartment normally affording open communication between such compartment and the inflating channel, said connection being in the path which the partition follows upon the puncturing of the compartment so as to cause the partition to effect the closing of the connection.

6. An air tube for pneumatic tires having a series of partitions dividing said tube into a series of compartments and adapted to be bellied out into a punctured compartment, said partitions being slack when the tube is fully inflated, a flexible rubber tube in each compartment, in the path which a partition of such compartment will follow in the event of such compartment's being punctured, so that the bellied-out partition of the punctured compartment will come in contact with said flexible tube and bend it to close the passage of such flexible tube, said air tube being further formed with a passage running around the inner periphery thereof and normally communicating with said compartments through said flexible rubber tubes and being provided with an inflation valve.

THOMAS BAKER McLEROTH.